United States Patent [19]

Mason

[11] 3,918,166
[45] Nov. 11, 1975

[54] HEAD CIRCUMFERENCE MEASURING DEVICE

[76] Inventor: Peter Mason, c/o The International Grenfell Association, St. Anthony, Newfoundland, Canada

[22] Filed: Dec. 10, 1973

[21] Appl. No.: 423,156

[52] U.S. Cl. .................. 33/179; 33/138; 33/174 D
[51] Int. Cl.² ......................................... G01B 3/10
[58] Field of Search ....... 33/137 R, 138, 174 D, 179

[56] References Cited
UNITED STATES PATENTS

| | | | |
|---|---|---|---|
| 2,129,582 | 9/1938 | Johansson | 33/179 |
| 3,514,863 | 6/1970 | Moll | 33/138 |

FOREIGN PATENTS OR APPLICATIONS

| | | | |
|---|---|---|---|
| 347,491 | 1/1922 | Germany | 33/179 |

*Primary Examiner*—Richard E. Aegerter
*Assistant Examiner*—Richard R. Stearns
*Attorney, Agent, or Firm*—Kenway & Jenney

[57] ABSTRACT

A device for measuring the circumference of a head has an elastic belt that is placed around the head in a plane that defines a maximum circumference. On its outer surface, the belt carries an encircling measuring tape. One end of the tape is fixed while the other end is held under a constant tension by a spring-loaded storage reel. Expansion or contraction of the belt, corresponding to the size of the enclosed head, is translated into a directly proportional movement of the tape as it winds or unwinds on the reel. In one form, the belt has a pair of embossed ribs circling its outward facing edges, each rib having a mutually facing groove that engages an edge of the tape.

2 Claims, 3 Drawing Figures

U.S. Patent  Nov. 11, 1975  3,918,166
FIG. 1
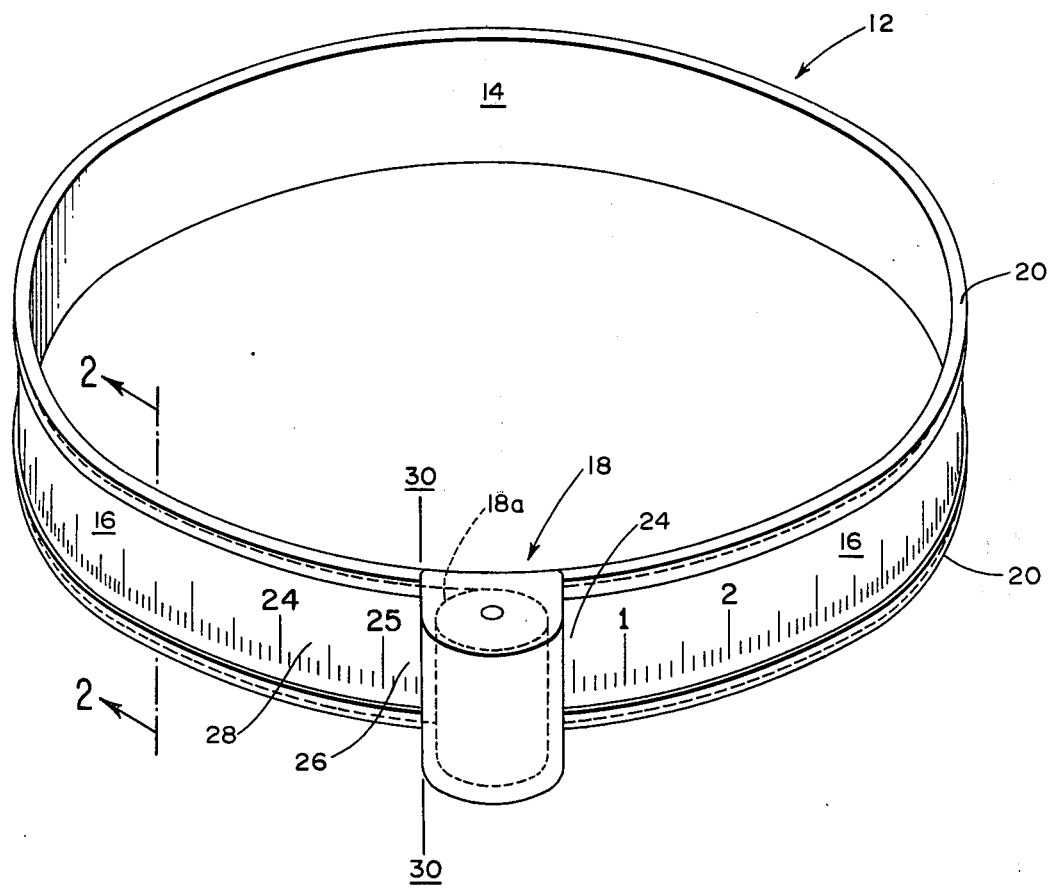
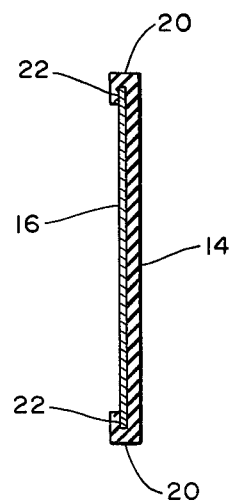
FIG. 2
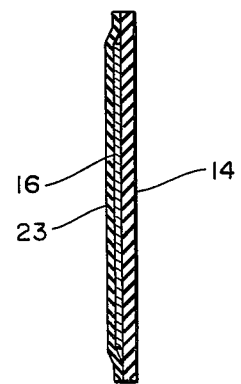
FIG. 3

HEAD IRCUMFERENCE MEASURING DEVICE

BACKGROUND OF THE INVENTION

This invention relates in general to measuring instruments and more specifically to instruments for medical use in the measurement of the circumference of heads. The measurement of head circumferences is an essential part of the examination of an infant since it is a direct reflection of the growth of the brain. This measurement is also important in detecting a variety of abnormalities in growth and development such as hydrocephalus and microcephaly.

It is a common practice to measure head circumferences with a flexible, disposable paper tape. To take a measurement, the tape is simply drawn around the head in an approximately horizontal plane with the tape overlapping one of its ends. The person taking the measurement exercises his judgment as to whether the tape encloses a maximum circumference.

Judgment is also exercised in drawing the tape tight so that the har is pressed against the skull and the tape generally conforms to the shape of the skull. To insure that the reading represents a maximum circumference, the ends of the tape are usually adjusted vertically and further readings are taken. It is also advisable to completely remove the tape and take a second independent measurement.

This technique has the disadvantage of introducing various sources of error. First, the measurement will vary substantially with different initial placements of the tape. It is therefore necessary to adjust the positioning of the tape and to take multiple readings corresponding to adjusted positions and then repeat the entire process. This can be highly inconvenient, particularly if the infant being measured is uncooperative. Second, the amount of tension applied to the tape during successive measurements can vary greatly. The inherent elasticity of conventional paper tapes will cause these variances in tension to appear as differences in the head measurement typically ranging from three-quarter centimeter to three centimeters. Third, it is difficult in practice to wrap the tape so that is lies in a single horizontal plane. If the tape deviates from a single plane, an inaccurate measurement will result. Fourth, if the head is highly sloped, the conventional tapes can slip out of position as the measurement is taken.

Accordingly, a principal object of this invention is to provide a head circumference measuring device that is highly accurate and convenient to use.

Another object of this invention is to provide a head circumference measuring device that holds itself in position on the head and closely follows the contour of the head.

Still another object is to provide a head circumference measuring device that maintains a constant tension in the measuring tape.

Yet another object is to provide a head circumference measuring device that holds the measuring tape in one plane.

A further object is to provide a head circumference measuring device that may be readily adjusted to alternate positions.

SUMMARY OF THE INVENTION

The head circumference measuring device of this invention employs an elastic belt that is stretched around a head in a single measuring plane. The outer surface of the belt carries a measuring tape that has one end fixed relative to the belt. The other end of the tape is held at an approximately constant tension by a spring-loaded storage reel. As the circumference enclosed by the elastic band varies, the tape winds or unwinds on the reel. The total amount of tape unwound from the reel therefore gives a measurement of the enclosed head circumference. The tape is ruled and calibrated to give a direct reading of the head circumference.

The elasticity of the belt and the tension in the surrounding tape serve to hold the device in a given position without external assistance. A slight expansion of the belt permits easy removal or repositioning. An inherent resistance to lateral bending in both the belt and the tape aids in positioning and maintaining the device in a single plane.

In one form, the tape is held on the belt by means of a pair of embossed ribs that encircle the outward facing edges of the belt. The ribs have mutually facing grooves that engage the edges of the tape. In another form, the tape is held in contact with the belt by means of a covering strip of stretch material that sandwiches the tape, the edges of the belt and the strip being bonded together.

These and other features of this invention will be fully understood from the following detailed description of the preferred embodiments which should be read in connection with the accompanying drawings.

BRIEF DESCRIPTION OF THE DRAWINGS

FIG. 1 is a perspective view of one embodiment of a head circumference measuring device constructed in accordance with this invention;

FIG. 2 is a cross-sectional view along the line 2—2 of FIG. 1; and

FIG. 3 is a cross-sectional view of another embodiment of a head circumference measuring device constructed in accordance with this invention.

DETAILED DESCRIPTION OF THE PREFERRED EMBODIMENTS

With reference to FIG. 1, a head circumference measuring device, indicated generally at 12, has an elastic belt 14 that carries a surrounding measuring tape 16 and a storage reel 18. The elastic belt 14 forms a continuous closed loop having a circumference somewhat smaller that the circumference of the smallest head to be measured by the device 12. A suitable unstretched circumference for use with infants and children is 25 centimeters. The belt should be wide enough to resist lateral bending, but narrow enough to define with accuracy a plane of maximum circumference. A one to two centimeter width is recommended. The belt should also be relatively thin, the exact thickness depending on the material used and desired degree of elasticity. The belt can be manufactured from conventional rubber or any material having equivalent elasticity. The degree of elasticity should allow the belt to be easily stretched for placement on the head, but sufficiently taut to conform closely to the contours of the skull when it is in place.

In the embodiment illustrated in FIGS. 1 and 2, the belt 14 has a pair of grooved ribs 20 embossed on its outer surface. The grooves 22 are transverse to the ribs with their openings facing one another. The width of the tracks is sufficient to firmly engage the edges of the tape 16. The tracks 22 serve to hold the tape in the same configuration as the belt and to guarantee that the tape is in continuous contact with the belt. It is essential to maintain this contact since any gap between the tape and the belt results in a variance between the actual head circumference and the head circumference as measured by the tape 16. The ribs 20 also serve to prevent the edge of the tape from cutting the skin. This problem appears frequently when conventional paper tapes are used in infants having highly sloped skulls.

In another embodiment, illustrated in FIG. 3, the tape 16 is held on the belt by means of a strip of flexible material 23. The strip 23 is placed over the tape 16 so that the tape is sandwiched between the strip and the belt. The positioning is secured by bonding the edges of the belt to the corresponding edge of the belt. The covering strip 23 can be a conventional rubber material like that of the belt 14.

The tape 16 is an elongated strip of flexible, but relatively inelastic material such as cloth, plastic, or metal. Due to the danger of the tape 16 digging into or cutting the skin, cloth is recommended. The tape 16 encircles the belt 14, the edges of each member lying in parallel planes. One end 24 of the tape is fixed relative to the belt 14 by attachment to the housing of the storage reels 18 or to the belt. The other end 26 of the tape is wound on the storage reel 18. Preferably the storage reel covers a portion of the fixed end 24 so that the tape 16 fully encircles the belt. Thus, changes in the circumference of the belt are directly translated into changes in the length of the surrounding tape. The full length of the tape is preferably forty centimeters. This length provides a suitable range of measurements without having a large amount of the tape stored on the reel 18.

The length of the tape is conveniently measured by means of ruled marks 28 on the outer surface of the tape. These marks preferably delineate centimeters and portions of centimeters since it is standard procedure to express a head circumference measurement in metric units. A reference line 30 is situated so that it indicates the total length of the encircling tape, and therefore the circumference of the head under measurement. A reference line can be defined simply by fixed end 24, or, as illustrated in FIG. 1, by the line of entrance 30 of the tape into the reel housing. It should be noted that any overlap between the end 24 and the reference line 30 will result in inaccurate readings since the circumference along the overlap will be measured twice.

The reel 18 has a spring, not shown, that urges a storage roller 18a to rotate so that the tape 16 is wound thereon. The spring maintains a substantially constant tension in the tape, thus eliminating any measurement errors due to variance in the applied tension. The tension is constant because the spring constant does not vary to a detectable degree over the small changes in angular position of the roller 18a. The amount of tension in the tape should be sufficient to hold the tape 16 in continuous contact with the elastic belt 14.

To measure a head circumference, the device 12 is stretched to fit over the head. The belt is then positioned with the front portion passing over the frontal bone above the supraorbital ridge and the rear portion in the level of the occiput. Care should be that there are no vertical warps, undulations, or other deviations from a single measuring plane. The elastic belt automatically crushes the hair against the scalp, closely follows the irregular contours of the head, and fixes the position of the device on the head. The reel then automatically draws the tape around the belt at a constant tension. The reference line 30 then gives a highly accurate reading of the circumference of the head. Repeated measurements are made easily by stretching the belt, removing it, and repositioning it as described above. The self-holding feature of this device is especially convenient in adjusting the device once it is positioned. The person taking the measurement can stand away from the patient, view the placement from all sides, and readily determine if the position is correct. If there are lateral variations from a single measuring plane, those portions of the belt are lifted away from the head, repositioned, and released.

This description therefore discloses a simple, highly accurate, and convenient device for measuring the circumference of heads. It may be seen that the invention can also be adapted to the measurements of the circumference of other irregularly shaped objects, and such applications are intended to fall within the scope of this invention. For example, a device according to this invention can be adapted to measure calf circumferences for the diagnosis and treatment of phlebitis. Further, various modifications of the invention will become apparent to those skilled in the art from the foregoing description and accompanying drawings. Such modifications are intended to fall within the scope of the appended claims.

What is claimed is:

1. A device for measuring the circumference of a head comprising, in combination,
   a closed-looped rubber belt which bears inwardly against said head with sufficient force to crush hair on the head against the scalp,
   a cloth measuring tape encircling said belt having a length of approximately 40 centimeters, said tape having a first end fixed relative to said belt, a second end held at a substantially constant tension, and measuring marks on its outer surface,
   a storage reel mounted in a fixed relationship relative to said first tape end, said reel having
      A. roller means for winding said tape, said roller means holding said second end and an adjacent portion of said tape, and
      B. retractor means urging said roller means at a substantially constant tension to wind said tape so that a portion of said tape is wound onto said roller means as said belt contracts, and a portion of said tape is unwound from said roller means as said belt expands, and
   a pair of embossed rubber ribs circling the outward facing edges of said belt, each rib having a transverse mutually facing groove which engages the edges of said tape.

2. A device for measuring the circumference of a head comprising, in combination,
   a closed-looped rubber belt which bears inwardly against said head with sufficient force to crush hair on the head against the scalp,
   a cloth measuring tape encircling said belt having a length of approximately 40 centimeters, said tape having a first end fixed relative to said belt, a second end held at a substantially constant tension, and measuring marks on its outer surface,
   a storage reel mounted in fixed relationship relative to said first tape end, said reel having A. roller means for winding said tape, said roller means holding said second end and an adjacent portion of said tape, and
B. retractor means urging said roller means at a substantially constant tension to wind said tape so that a portion of said tape is wound onto said roller means as said belt contracts, and a portion of said tape is unwound from said roller means as said belt expands, and an elastic strip substantially surrounding said tape and bonded to said rubber belt at their common edges.

\* \* \* \* \*